United States Patent [19]
Desmond et al.

[11] 4,103,905
[45] Aug. 1, 1978

[54] VARIABLE RADIUS SPRINGBACK WAVY SEAL

[75] Inventors: John W. Desmond, Media; Joseph F. Kmec, Aston; Charles A. Meyer, Media, all of Pa.

[73] Assignee: Westinghouse Electric Corp., Pittsburgh, Pa.

[21] Appl. No.: 766,475

[22] Filed: Feb. 7, 1977

Related U.S. Application Data

[63] Continuation of Ser. No. 665,346, Mar. 9, 1976, abandoned.

[51] Int. Cl.² .................. F16J 15/48; F01D 5/20
[52] U.S. Cl. ........................................ 277/56; 277/70; 277/160; 415/113; 415/172 A
[58] Field of Search ............... 277/27, 45, 50, 53–57, 277/70, 84, 94, 95, 138, 157, 158, 160, 173, 174, 176, 192, 199, 200, 208–210, 213; 267/1.5; 415/113, 171, 172 A

[56] References Cited

U.S. PATENT DOCUMENTS

| | | | |
|---|---|---|---|
| 935,286 | 9/1909 | Westinghouse | 415/172 A |
| 945,180 | 1/1910 | Ljungstrom | 277/56 |
| 1,338,955 | 5/1920 | Parsons et al. | 277/27 |
| 1,694,566 | 12/1928 | Solenberger | 267/1.5 |
| 2,486,088 | 10/1949 | Yaros | 277/70 X |
| 2,945,730 | 7/1960 | Murray et al. | 277/56 X |
| 2,946,609 | 7/1960 | Comery | 277/53 X |
| 3,082,010 | 3/1963 | Morley et al. | 277/56 X |
| 3,109,661 | 11/1963 | Swaim et al. | 277/70 |
| 3,501,246 | 3/1970 | Hickey | 277/160 X |
| 3,503,616 | 3/1970 | Hickey | 415/171 X |

FOREIGN PATENT DOCUMENTS

| | | | |
|---|---|---|---|
| 444,814 | 3/1936 | United Kingdom | 277/56 |
| 918,594 | 2/1963 | United Kingdom | 277/56 |

*Primary Examiner*—Robert S. Ward, Jr.
*Attorney, Agent, or Firm*—J. W. Keen

[57] ABSTRACT

A variable radius labyrinth seal arrangement for use in a steam turbine apparatus is characterized by a flexible strip member having mounted substantially perpendicular thereto a series of corrugated uprights. The strip is received within a circumferential groove provided in the turbine casing and is flexible to conform to the curvature of the groove, thus permitting seal use in a variety of turbine sizes. The amplitude of the corrugations, or waviness, of the uprights varies in accordance to the magnitude of the flexure of the strip necessary for the strip to conform to the groove curvature. The strip is movably biased within the groove and responds to forces generated by contacts between the uprights and rotating turbine elements by displacing radially outward from that contact.

11 Claims, 6 Drawing Figures

VARIABLE RADIUS SPRINGBACK WAVY SEAL

This is a CONTINUATION of application Ser. No. 665,346 filed Mar. 9, 1976, now abandoned.

BACKGROUND OF THE INVENTION

1. Field of the Invention

This invention relates to labyrinth seal arrangements and, in particular, to a labyrinth seal arrangement having the ability to fit a variety of turbine diameters.

2. Description of the Prior Art

In rotating machinery, for example, large turbo-generators, it is imperative that suitable seal arrangements be provided to prevent the passage of pressurized fluid from a region of higher to lower pressure along an interface between a rotating and stationary element of the machine. Such a necessity arises in a variety of locations within the turbo-machine, for example, between the radially outer surface of the shroud ring attached to the tips of rotating blades and the radially adjacent inner surface of the casing or between the outer surface of the rotating shaft and the radially adjacent inner surface of the turbine casing at the axial points along the shaft where the shaft passes through the casing.

Typical prior art solutions to the sealing problem above outlined utilize a device known as a labyrinth seal. The labyrinth seal disposes a plurality of axially adjacent seal strips which depend from the interior of the stationary casing to block the radial gap between the rotating and stationary members and reduce that gap to a clearance of several thousandths of an inch. There may also be provided on the rotating element deflector seal strips which extend radially outward from the rotating member and are spaced so as to lie axially between the adjacent labyrinth strips. Typical prior art construction requires that radial overlap occur between the labyrinth and deflector strips. An inventive improvement in the sealing arrangement just described wherein deflector seal strips are utilized is that disclosed and claimed in the copending application of C. A. Meyer, Ser. No. 665,347, filed Mar. 9, 1976, assigned to the assignee of the present invention.

With or without the combination of deflector strips however, the purpose of the labyrinth seal is to provide a tortuous path for fluid particles to negotiate in an attempt to pass from a higher to a lower pressure region along the interface between the stationary and rotating member. Typically, the prior art labyrinth seal takes one of two forms. First, the rigid caulked-in seal is secured into a groove machined into the cylinder or stationary element. This arrangement proves costly during manufacturing based on the fact that the final radial clearance is only a few thousandths of an inch and both the rotor shroud and stationary seal are machined to drawing dimensions prior to assembly. It is only possible to determine the accuracy of the small clearance after the rotor is assembled in the cylinder. To correct the radial clearance, if necessary, the large cylinder is disassembled, correctively machined, and returned for final assembly and for final seal clearance confirmation. To restore original seal radial clearance is even more time consuming and costly when the problem is encountered in the field.

The second form of prior art seal is the two-legged springback seal. This consists of a two-labyrinth seal segment, precisely machined to the correct diameter. Basically, since every turbine stage has a different diameter, the seals cannot be interchanged between stages in the event of damage, over-machining or for any other reason. Over-machining, for example, can easily occur due to the fact that the seals are radially customized. As illustrated in the caulked-in seal discussed above, the major assembly must be substantially dismantled for radial seal correction. The radial customizing of the springback seal is to machine the radial legs of the seal in a special portable machine as part of the assembly operation. A short measurement between the rotating and stationary components enables the radial customizing. Some seal arrangements also entrap steam condensate or precipitated contaminants and are thus disadvantageous for use within turbo-machinery.

Representative of the prior art seal arrangements, are U.S. Pat. Nos. 3,694,882, issued to Desmond and assigned to the assignee of the present invention; 3,501,245, issued to Ivanko; 3,082,010, issued to Morley; 2,946,609, and 2,871,038, both issued to Comery; and 2,886,351, issued to Heard. It is noteworthy at this point to appreciate that in referencing prior art patents as background herein, no representation is made that the cited subject matter is the best available prior art.

It is apparent from the foregoing that prior art seal arrangements are disadvantageous for several reasons. Applicants herein disclose a seal arrangement which overcomes all of the above-mentioned disadvantages of the prior art.

SUMMARY OF THE INVENTION

The seal arrangement disclosed and claimed herein for use between a rotating and stationary member comprises a flexible substantially rectangular strip or bed of stainless steel having a longitudinal axis therethrough being received within a T-shaped groove provided circumferentially about the interior of the stationary member. A plurality of arrays of axially spaced uprights are mounted on the groove substantially parallel to the axis thereof and lie substantially perpendicular thereto at each point of attachment therebetween. Each upright is suitably affixed to the bed and undulates about lines parallel to the bed axis so as to impart a wavy or corrugated configuration to the upright. The bed is receivable into the T groove provided on the interior of any sized diameter turbine casing, the bed flexing so as to adopt the curvature of the particular turbine casing into which it is inserted.

The amplitude of the corrugations at the edge of the upright opposite the edge attached to the bed varies, relative to the axis of the bed, according to the amount of flexure required by the bed in order to conform to the curvature of the T groove disposed within the casing. Thus, a seal embodying the teachings of this invention is universally applicable to any diameter size turbomachine. Also provided are spring biasing means acting against the base of the groove and the back of the bed member to bias the bed in contact against the radially outward surfaces of the flanges of the T groove. Thus, a "springback" capability is provided in applicants' seal arrangement such that abrasive contact between the rotating member and the steel strips cause the steel to move radially outward away from the point of contact and against the force of the bias spring. Openings which permit introduction of high pressure fluid to assist in maintaining the seal strip in position may also be provided.

It is an object of this invention to provide a labyrinth seal arrangement having a variable radius capability so as to permit utilization on any diameter turbo-machine. It is a further object of this invention to provide a seal arrangement in which seal strips exhibit a corrugated configuration, the magnitude of which varies according to the amount of flexure the bed member to which the strips are affixed must undergo in order to conform to the curvature of the groove into which it is inserted. Further, it is an object of this invention to provide an easy to install, readily customizable seal arrangement with a radial springback capability for use in sealing rotating and stationary members of turbo-machines of any predetermined diameter. Other objects of the invention will become clear from the following detailed description of the preferred embodiment which follows herein.

BRIEF DESCRIPTION OF THE DRAWINGS

The invention will be more fully understood from the following detailed description of a preferred embodiment, taken in connection with the accompanying drawings, in which.

DESCRIPTION OF THE PREFERRED EMBODIMENT

Figure 1:
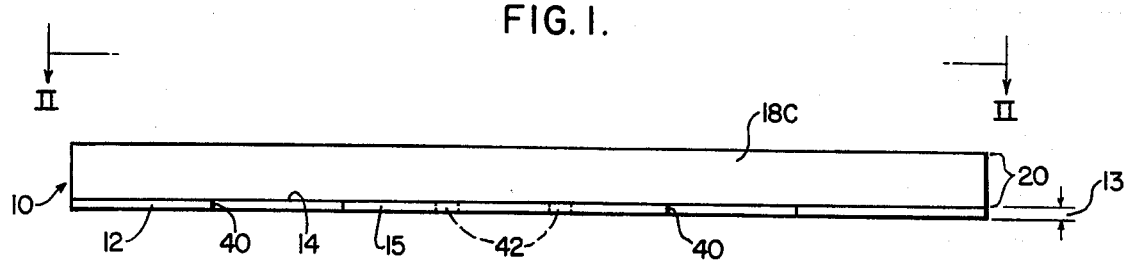
FIG. 1 is an elevational view of a seal strip embodying the teachings of this invention.

Throughout the following description similar reference numerals refer to similar elements in all figures of the drawings.

Figure 2:
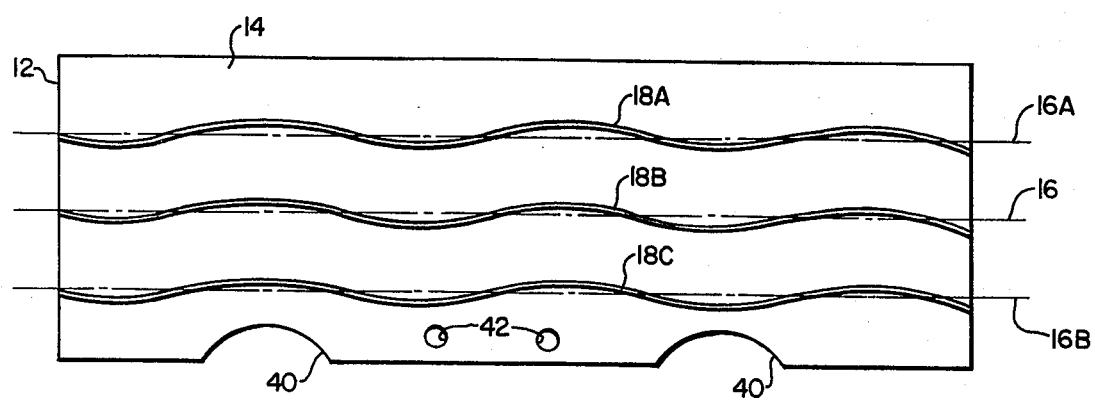
FIG. 2 is a plan view taken along lines II—II of FIG. 1.

Referring first to FIGS. 1 and 2, there are shown views in elevation and plan of a seal strip embodying the teachings of this invention and utilized as elements in applicants' inventive seal arrangement. The seal element generally indicated by reference numeral 10 is fabricated entirely of stainless steel and includes a flexible substantially rectangular strip, or bed, 12 fabricated of stainless steel. The strip 12 may be of any predetermined length, depending upon the diameter of the turbine in which it is to be utilized. Of course, it is within the contemplation of this invention to dispose a plurality of seal strips circumferentially end-to-end in order to accomplish sealing throughout the largest diameter turbines, in a manner which will become clearer herein. The bed 12 is of a predetermined thickness 13 approximately 1/32 of an inch and defines an upper surface 14 and a lower surface 15. However, the bed 12 has as a characteristic thereof the ability to readily flex and conform itself to any predetermined curvature. The bed 12 has an axis 16 extending therethrough and, as best seen in FIG. 2, there are any predetermined number of lines 16A and 16B which extend parallel to the axis of the bed 12.

Referring to FIG. 2, there is seen in plan view of the bed 12 having affixed thereto a plurality of wavy seal strips 18A, B and C, each strip being fabricated of thin stainless steel and suitably attached to the bed 12. Any manner of attachment of the strips 18 to the bed 12 may be utilized although applicants have found that resistance welding and then brazing of the strips 18 to the bed 12 is most advantageous and provides suitable service of the seal throughout all operating temperature ranges of turbine blade paths. Each of the strips 18 extends a predetermined dimension 20 from the bed 12. Each strip is mounted edgewise to the bed 12 such that each portion of the strip is perpendicular to the bed 12 at its point of attachment thereto. As will be pointed out herein, each strip 18 is mounted in a wavy orientation relative to the axis 16 of the strip 12 and to lines 16A and 16B parallel thereto. Thus, as seen in FIG. 2, each strip 18 is mounted to the bed 12 so as to produce a corrugated effect and vary in amplitude relative to the axis or lines parallel thereto of the bed 12. It has been observed that a corrugated or buckling effect of no less than 0.01 inches relative to the axis 16 and lines 16A and 16B parallel thereto is necessary to provide the high degree of flexibility required to permit the seal arrangement 10 to conform to any predetermined curvature and thereby fit any predetermined turbo-machine. Alternatively, the seal strips can be straight when attached to the bed and can be crimped, by a suitable crimping tool, to provide for any desired curvature of the bed.

Figure 3:
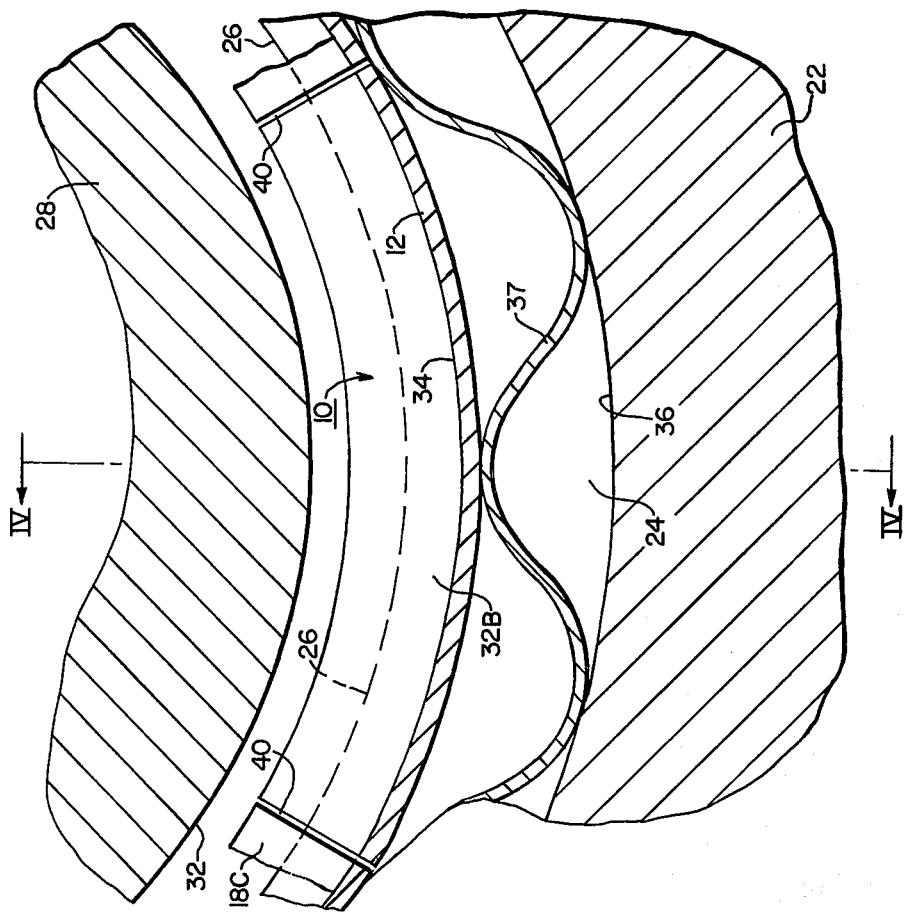
FIG. 3 is a view, partially in section, showing the seal embodying the teachings of this invention disposed in a typical operative environment within a turbo-machine.
Figure 4:
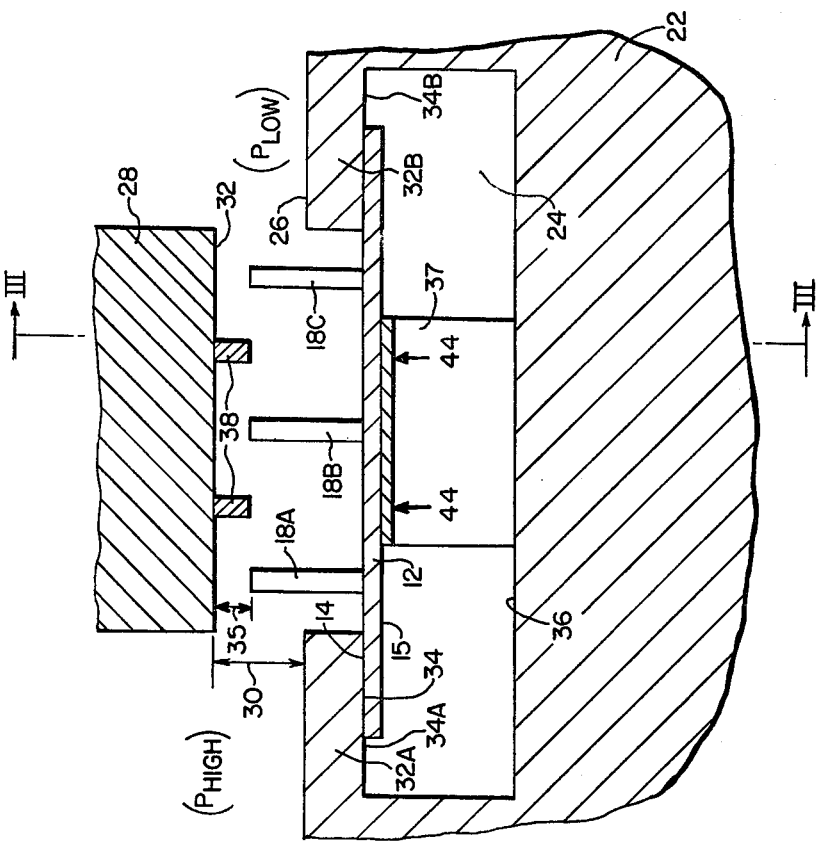
FIG. 4 is a view taken along lines IV—IV of FIG. 3.

Referring now to FIGS. 3 and 4, the seal element 10 described in isolation in FIGS. 1 and 2 is shown in a typical sealing environment within a turbine machine. Applicants wish to point out that although the following description is grounded in terms of a sealing arrangement for a steam turbine apparatus, the seal arrangement defined herein is applicable to any environment wherein there is required sealing of a stationary member with a movable member rotating with respect thereto, such as an axial compressor or pump.

In FIGS. 3 and 4, the seal 10 embodying the teachings of this invention is disposed to prevent leakage of fluid from a high pressure region ($P_{High}$) to a lower pressure region ($P_{Low}$) along an interface defined between a rotating element and a stationary element. As seen in FIGS. 3 and 4, the stationary element generally referred to by reference numeral 22 has a circumferential groove 24 disposed on the radially interior surface 26 thereof. In the particular application shown in FIGS. 3 and 4, the stationary element 22 is the casing of a steam turbine apparatus. A rotating element 28 such as the shroud of a bladed array of turbine blades defines a predetermined radial clearance 30 between the radially outer surface 32 of the shroud 28 and the radially inner surface 26 of the casing 22. The groove 24 is substantially T-shaped in cross-section and has first and second flanges 32A and 32B thereon, each flange having a radially inner surface 34 and a radially outward surface 36 thereon. Flanges 32A and 32B have radially inner surfaces 34A and 34B respectively.

As seen best in FIG. 3, the interior surface 26 of the casing 22 has a predetermined curvature associated therewith. The seal element 10 is inserted within the groove 24 such that the axis 16 thereof lies circumferentially disposed about the interior of the casing 22. As stated above, the bed 12 is sufficiently flexible and the configuration of the uprights 18 is disposed such that the bed 12 may flex to conform to any given curvature of any given turbine casing. Each of the uprights 18 extends radially inward relative to an axis of rotation of the rotating member so as to close the gap 30 between the rotating element 28 and the stationary element 22. There is usually provided a small radial clearance 35 between the extremity of the upright 18 and the radially outward surface 32 of the rotating member. The bed 12 is inserted within the groove 24 and biased by a suitable biasing spring 37 which cooperates with the base of the groove and the bottom surface 15 of the bed 12 to urge the upper surface 14 of the bed 12 to contact with the radial outward surface 34 of each of the flanges 32. As will be discussed at the later point herein, a positive seal pressure may be utilized to assist in maintaining contact between the surfaces 14 and 34.

As shown in FIG. 4, and not part of the instant invention, it may also be advantageous to dispose on the radially outward surface 32 of the rotating element 28 a plurality of deflector elements 38 which cooperate with the seal strip 10 to provide effective sealing between the rotating and stationary elements to prevent the passage of fluid from a high pressure region to a low pressure region through the gap 30 defined between the rotating element 28 and the stationary element 22. The copending application of C. A. Meyer, Ser. No. 665,347, filed Mar. 9, 1976, discloses and claims an inventive seal arrangement utilizing a deflector seal.

Figure 5A:
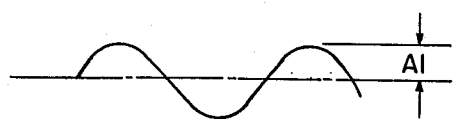
FIGS. 5A and 5B are diagrammatic views indicating the change in magnitude of the corrugations of a seal arrangement embodying the teachings of this invention.
Figure 5B:
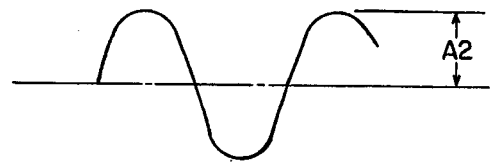

It may thus be appreciated from the foregoing description that the construction of the seal strip 10 embodying the teachings of this invention permits the utilization thereof on any sized diameter turbine apparatus. As stated, in the unflexed state, and as shown in FIG. 5A, each upright 18 waves with respect to a line 16 with a predetermined amplitude A1. However, when the bed 12 flexes to conform to the given curvature of the stationary casing into which it is inserted, the edges of the uprights opposite the attached edges thereof undergo a variation in the amplitude relative to the line 16. Thus when the bed 12 flexes in order to conform to the curvature of the groove into which it is inserted, the amplitude of the uprights increases to a dimension A2, thus readily permitting the flexure of the base 12 to occur. It is also understood that FIGS. 5A and 5B are illustrative only of the principles of operation of the device and do not describe the relative amplitude changes of the uprights as the bed 12 flexes to conform to a given curvature.

The provision of the bias means 37, such as the leaf spring, imparts a springback capability to the seal arrangement embodying the teachings of this invention. Thus, when contact between the rotating member and the seal uprights occurs, the force of that contact will urge the seal element 10 away from, that is radially outward from, the contact point. Thus, the seal arrangement 10 will be displaced radially outward against the bias force of the spring 37 so as to minimize damage both to the seal and to the rotating element. Although the seal itself may be slightly damaged, the damage is minimized by the springback effect.

It is emphasized that the readily flexible nature of the seal element 10 is imparted through the combination of the thin flexible bed with the wavy or corrugated upright strip attached thereto. The bending of the seal element 10 to an infinite number of diameters is accomplished by the configuration of the corrugations distorting, as shown in FIGS. 5A and 5B, but such distortion is to be understood as having little or no effect upon the radial height of the seal uprights. Thus, the clearance 35 is not appreciably altered and there is therefore no detrimental effect upon the seal clearance.

If the diameter of the turbine under consideration is greater than the length of an individual strip, sealing may be effected through the simple expedient of inserting a second seal strip 10 into the T groove 24 in a circumferential end-to-end configuration with a previously inserted seal strip, as suggested in FIG. 3 at reference numeral 40. The complete sealing of a full circle is accomplished by the addition of circumferential end-to-end configurations. Seal segments are interrupted at locations such as stationary component horizontal joints and expansion gaps in stationary welded assemblies.

The springback feature imparted by the serpentine spring 37 accomplishes two main objectives. First, it permits each assembly and disassembly of the seal within the cylinder. Secondly, it provides the above-described springback advantage in the event of abrasion of rotor rub. It should also be noted in this regard that the risk of damage to the rotating parts is therefore minimized due to the light construction of the seal uprights and further due to the small metallic contact (as a function of the springback) between the rotor in the event of abrasion.

In order to assist in the positive sealing of the seal strip 10 in the groove 24, scalloped openings 40 or holes 42 (FIG. 1) may be provided in the bed 12. When disposed within the groove 24, the scalloped opening 40 or hole 42 is disposed adjacent to the high pressure region ($P_{High}$). High pressure fluid enters the groove 24 through the openings 40 or 42 and collects within the groove 24 where it exerts a force acting in direction 44 (FIG. 4) to assist in maintaining the bed 12 in position. The spring 37 initially holds the bed 12 away from the base of the groove 24 so as to define a volume into which the high pressure fluid may enter to the groove 24.

The radial customizing requirement, which is so costly and time consuming in the prior art, is easily accomplished by the simple expedient of holding the seal strip 10 against a surface grinder and grinding to the required seal height 20. As a further advantage, the wavy seal design disclosed hereinabove does not trap water or nuclear contaminants as do prior art seals, in particular, honeycomb seals.

It is apparent that the seal embodying the teachings of this invention overcomes all of the above-discussed disadvantages of the prior art. The wavy seal above-described when assembled into a biased condition in the T groove permits the element to be applicable for use in all turbine diameters. The utilization of all stainless steel fabricating materials and resistant welding with brazing techniques permits utilization of the seal throughout the full temperature range encountered within turbine apparatus. The springback design permits easy assembly and disassembly in addition to eliminating deleterious effect of rotor rubs and damage to both the seal and the rotating elements.

In sum, a universally applicable seal arrangement is described herein which overcomes all of the aforementioned disadvantages of prior art seals to provide effective sealing to prevent the passage of fluid from a high pressure to a low pressure region along the clearance space between a rotating and a stationary element. We claim as our invention:

1. In combination a seal arrangement, a rotatable member, and a stationary member spacially separated from and disposed about said rotatable member, one of said members having a circumferential groove therein, said seal arrangement comprising:

a thin strip having generally parallel major surfaces an at least one undulating ribbon mounted in an edgewise manner along its length on one of said major surfaces so that the undulating ribbon and its undulations are generally perpendicular to the attached major surface, said strip being conformable to and receivable in said groove, the ends of said strip and attached ribbon being disposed in closely spaced, circumferentially adjacent relationship.

2. The seal arrangement of claim 1 wherein a biasing means radially biases said seal arrangement relative to said rotatable member's axis of rotation into the space separating the rotatable and stationary members.

3. The seal arrangement of claim 1 wherein the amplitude of the undulations of said ribbon is at least 0.01 inch.

4. The seal arrangement of claim 2 wherein said biasing means comprises a spring.

5. The seal arrangement of claim 2 wherein said strip has an opening therein disposed adjacent to a high pressure region, said opening being sized so as to permit high pressure fluid to collect within said groove and to exert a force on said strip to assist said biasing means in radially biasing said seal arrangement.

6. A tubine comprising a rotor member rotatable along an axis of rotation extending therethrough, a stationary member surrounding said rotor member, said rotor member and said stationary member having a predetermined annulus therebetween, a circumferentially disposed groove in at least one said member, a seal arrangement to be utilized in sealing the annulus between the rotor member and the stationary member, one of which has said circumferential groove therein, said seal arrangement comprising:

a thin strip having generally parallel major surfaces and at least one undulating ribbon mounted in an edgewise manner along its length on one of said major surfaces so that the undualting ribbon and its undulations are generally perpendicular to the attached major surface, said strip being conformable to and receivable in said groove, the ends of said strip and attached ribbon being disposed in closely spaced, circumferentially adjacent relationship.

7. The turbine of claim 6 wherein a biasing means radially biases said seal arrangement relative to said axis of rotation into the annulus separating the rotor and stationary members.

8. The turbine of claim 6 wherein the amplitude of the undulations of said ribbon is at least 0.01 inch.

9. The turbine of claim 6 wherein said biasing means comprises a spring.

10. The turbine of claim 7 wherein said strip has an opening therein disposed adjacent to a high pressure region within said tubrine, said opening being sized so as to permit high pressure fluid to collect within said groove and to exert a force on said strip to assist said biasing means in radially biasing said seal arrangement.

11. The turbine of claim 6, said circumferentially disposed groove being generally T-shaped and having flanges thereon, said groove's axial width being at least as large as said strip's width and said flanges being separated by a distance less than said strip's width and greater than the amplitude of said ribbon's undulations.

* * * * *